June 7, 1932.  E. A. WRIGHT  1,861,828
VEHICLE BODY
Filed Aug. 2, 1926
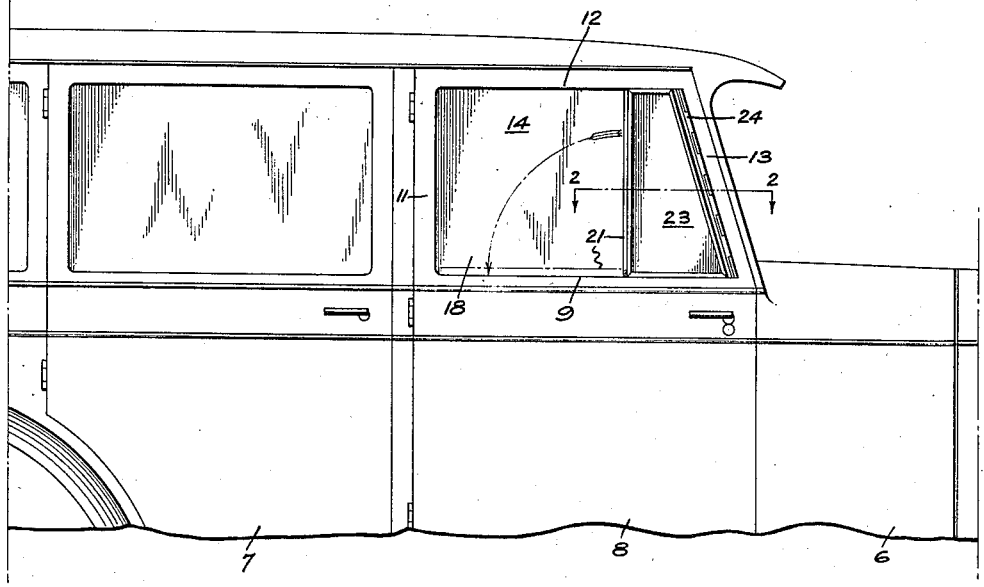
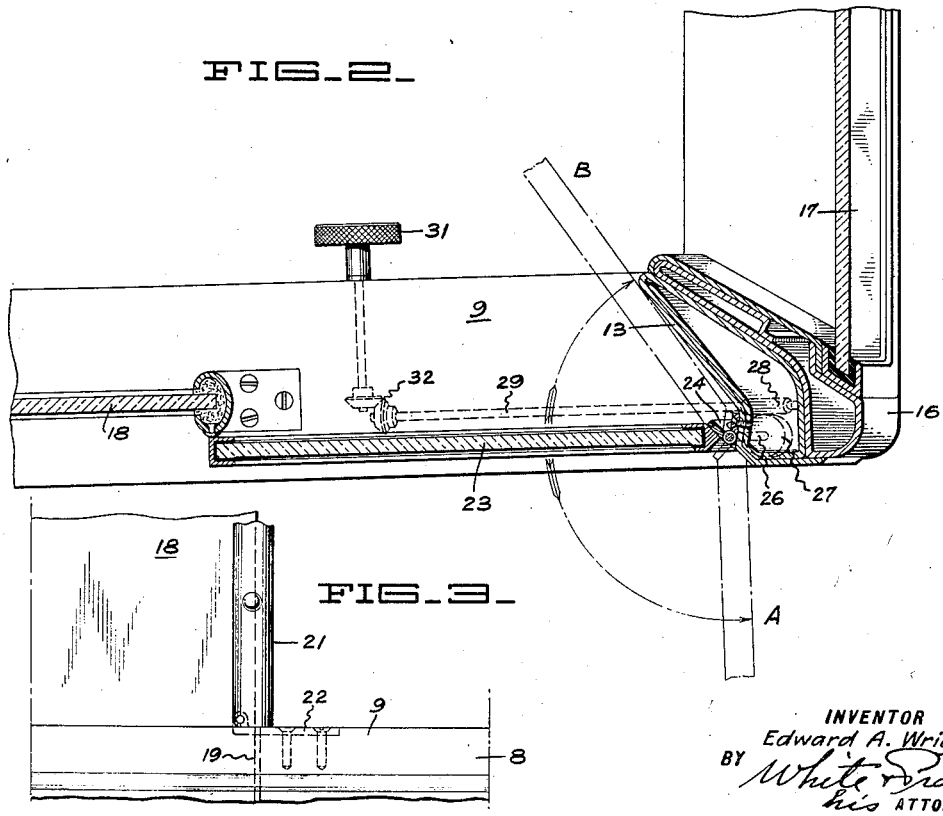
INVENTOR
Edward A. Wright
BY
his ATTORNEYS Patented June 7, 1932

1,861,828

UNITED STATES PATENT OFFICE

EDWARD A. WRIGHT, OF FRESNO, CALIFORNIA

VEHICLE BODY    REISSUED

Application filed August 2, 1926. Serial No. 126,576.

My invention relates to the construction of closed bodies for vehicles such as automobiles, and relates more particularly to the construction and arrangement of the windows thereof.

An object of my invention is to provide a window construction in a closed body such that the motion of the vehicle is utilized to ventilate the interior of the vehicle without causing drafts.

Another object of the invention is to provide a window construction in the body of a closed vehicle such that ventilation may be secured in inclement weather without readily permitting the entry of rain or snow to the interior of the vehicle.

Another object of the invention is to provide a closed body having a slanting windshield and corner posts of a small size.

The invention possesses other advantageous features, some of which with the foregoing will be set forth at length in the following description where I shall outline in full that form of my invention which I have selected for illustration in the drawing accompanying and forming part of the present specification. In said drawing I have shown one form of improved vehicle body embodying my invention, but it is to be understood that I do not limit myself to such form, since the invention, as set forth in the claims, may be embodied in a plurality of forms.

In said drawing:

Fig. 1 is a side elevation of a portion of a closed automobile body provided with the construction of my invention.

Fig. 2 is a cross section of a portion of the vehicle body, the plane of section being taken on the line 2—2 of Fig. 1.

Fig. 3 is an enlarged detail showing in side elevation a portion of the window guide.

Broadly speaking, the vehicle body of my invention comprises a window frame having a sliding window for closing a portion thereof and a hinged window for closing the remaining portion thereof.

In the construction of closed vehicle bodies, particularly bodies in which the front door jamb also forms the corner post for the windshield, it has been difficult to provide a slanting windshield without making the corner post disadvantageously large. The desirability of a slanting windshield is widely recognized and in order to satisfy the demand numerous complicated constructions have been resorted to. In practically every instance the corner posts have been so encumbered or enlarged that road vision has been dangerously interfered with. With the construction of my invention it is a simple matter to provide a slanting windshield and at the same time to keep the size of the corner posts comparatively small. In addition it is possible with my improved construction to ventilate thoroughly and well the interior of the vehicle without producing violent drafts. This is accomplished by providing a window which can be positioned so that the motion of the vehicle tends to induce air to flow from the interior of the vehicle. The window may also be positioned to permit the influx of a current of air into the vehicle body.

In the embodiment of the invention shown in the drawing, the vehicle body 6 is provided with a rear door 7 and a front door 8. Both of the doors are of the usual construction and the front door 8 is provided with a window frame comprising a bottom sill 9, a rear piece 11, a top piece 12 and a front piece 13. The four pieces form a quadrilateral frame around the window opening 14. The forward piece 13 is either upright or is slanted at any desired angle or degree and is complementary to the corner post 16 which is adapted to receive the windshield 17. The corner post and the window frame are both preferably made of cooperating pressed steel parts in order to reduce their combined size and increase their strength.

The rear portion of the window opening 14 is provided with a vertically sliding glass window 18 of the usual type. The rear edge of the window 18 is fitted into a suitable groove in the rear piece 11 in the usual way and its front edge slides in a slot 19 in the door 8 in the customary manner. A continuation of the slot 19 is provided in a guide 21 which is a suitable steel channel lined with felt or other cushioning material and receives the front edge of the glass 18. The guide is provided at its lower end with a hinge 22 by means of which it is fastened to the bottom sill 9 of the door frame. The upper end of the guide 21 may if desired, be provided with a suitable catch to fasten it to the upper piece 12 of the door frame. The disposition and the length of the guide 21 are such that the guide may be swung down on top of the lower sill 9 when the window 18 is lowered into the door 8.

The trapezoidal remaining portion of the window opening 14 is closed by a suitably shaped window 23. The second window 23 is hinged along its forward edge by means of a hinge 24 of the piano type to the forward piece of the window frame. The window 23 is so mounted that it may be swung outwardly from the window frame for approximately 90 degrees as indicated by the dotted lines showing position A in Fig. 2. The hinge 24 also permits the window 23 to be turned inwardly when the window 18 and the guide 21 are lowered, to lie against the forward member 13 of the window frame as shown in position B of Fig. 2. The glass of the window 23 may be made somewhat shorter so that the window can swing in and out freely without lowering the guide 21.

When the window 23 is in position A, the motion of the vehicle induces air to flow from the interior of the vehicle outwardly and ventilates the interior of the vehicle without causing an unwanted draft of air upon the occupants. When the window 23 is swung inwardly to the position B, the motion of the vehicle permits a current of air to pass thru the space between the guide 21 and the front piece 13 and supplies the interior of the vehicle with fresh air.

Means are provided for positioning the window 23 and maintaining it in the desired position. The central rotating rod 26 of the hinge 24 is continued downwardly thru the lower sill 9 and into the interior of the door 8. The lower end of the rod 26 is provided with a worm wheel 27. A worm 28 mounted on a suitable shaft 29 engages the worm wheel 27 and is turned by a hand wheel 31 thru suitable intermediate gearing 32. Rotation of the hand wheel 31 in an appropriate direction rotates the window 23 to any desired position. Since the worm 28 and worm wheel 26 are irreversible, the position of the window 23 as determined by the hand wheel 31 is unaffected by any other pressure or force.

It will be appreciated that with the window construction of my invention it is possible to provide a slanting windshield without heavy corner posts and that it is possible to obtain adequate ventilation without objectionable drafts.

I claim:

1. In a vehicle body, a door forming a part of the body and having a unitary window frame, a guide extending across said frame, a window slidable in said door along one side of said frame and slidable in said guide, and a second window hinged to said door on the opposite side of said frame and adapted to close the opening between said opposite side and said guide.

2. In a vehicle body, a door forming a part of the body and having a unitary window frame, a guide pivoted to the frame and extending across the opening therein and parallel to one side of said frame, a window adapted slidably to close the opening between said one side and said guide, and a second hinged window adapted to close the opening between the opposite side of said window frame and said guide and means connected with the second window for opening or closing the same.

3. In a vehicle body, a window frame having a window opening therein, a vertically slidable window adapted to close only the rear portion of said window opening, and a second window mounted on the forward portion of said window frame, mounting means for the second window permitting the window to be opened inwardly or outwardly of the vehicle.

4. In a vehicle body, a door forming a part thereof and provided with a window opening in the upper portion of the door, a guide fixed to the door arranged to divide the window opening, a window slidable within the door between the guide and one side of the door to close the window opening on one side of the guide, a second window hinged to the door to close the opening on the other side of the guide, the second window being hinged so as to open inwardly or outwardly of the vehicle body, and means within the door and cooperating with the second window to adjust and hold the same.

5. In a vehicle body, a door forming a part thereof and provided with a window opening in the upper portion of the door, a guide fixed to the door arranged to divide the window opening, a window slidable within the door between the guide and one side of the door to close the window opening on one side of the guide, a second window hinged to the door to close the opening on the other side of the guide, the second window being hinged so as to open inwardly or outwardly of the vehicle body, and manually operable gear means in the door for moving the said second window.

6. In a vehicle body, a door forming a part thereof and having a window frame, a guide pivoted to and extending across said frame, a window slidable in said body along one side of the frame and slidable in said guide, a second window pivoted on the opposite side of the frame for closing the opening between said opposite side and the guide, and means connected with the second window for moving the same said means including an irreversible gear connection mounted within the door.

7. In a vehicle body, a window frame divided by a guide pivoted at one side of the frame, a sliding window within the body and adapted to slide in said guide, to close one portion of the window frame, a second window pivoted at one side of the frame to swing inwardly or outwardly of the vehicle and to close the remaining portion of the window frame, the guide being foldable on the frame to cover one end of the sliding window when the window is fully open.

8. A vehicle body having a windshield mounted in the front portion thereof, doors swingably mounted in the sides thereof, adjacent the ends of said windshield, a pair of panels movably mounted in the upper portions of each of said doors, one of said panels in each door being vertically pivoted to the forward door pillar and swingable outwardly toward the plane of said windshield, the other panel in each door being vertically slidable in the plane thereof.

In testimony whereof, I have hereunto set my hand.

EDWARD A. WRIGHT.